United States Patent
Patel et al.

(10) Patent No.: US 9,686,742 B1
(45) Date of Patent: Jun. 20, 2017

(54) METHOD AND APPARATUS TO REDUCE POWER CONSUMPTION IN STANDBY MODE FOR WIRELESS COMMUNICATION SYSTEMS

(71) Applicant: MBIT WIRELESS, INC., Newport Beach, CA (US)

(72) Inventors: Bhaskar Patel, San Clemente, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 71 days.

(21) Appl. No.: 14/849,853

(22) Filed: Sep. 10, 2015

(51) Int. Cl.
| | | |
|---|---|---|
| G01R 31/08 | (2006.01) |
| H04W 52/02 | (2009.01) |
| H04W 72/04 | (2009.01) |
| H04L 5/00 | (2006.01) |
| H04L 27/26 | (2006.01) |
| H04W 68/02 | (2009.01) |

(52) U.S. Cl.
CPC ....... *H04W 52/0225* (2013.01); *H04L 5/0044* (2013.01); *H04L 27/2601* (2013.01); *H04W 68/02* (2013.01); *H04W 72/042* (2013.01)

(58) Field of Classification Search
CPC .......... H04W 52/0225; H04W 72/042; H04W 68/02; H04L 27/2601; H04L 5/0044
See application file for complete search history.

(56) References Cited

U.S. PATENT DOCUMENTS

| | | | | |
|---|---|---|---|---|
| 6,400,289 B1 * | 6/2002 | Banerji | .................. | H03M 7/30 341/60 |
| 7,564,936 B2 * | 7/2009 | Fonteneau | .............. | H03M 5/12 375/361 |
| 9,407,291 B1 * | 8/2016 | Weingarten | ....... | H03M 13/2906 |
| 9,462,548 B1 * | 10/2016 | Govindassamy | . | H04W 52/0209 |
| 2001/0028690 A1 * | 10/2001 | Ebel, Sr. | ............... | H04L 1/0051 375/340 |
| 2012/0115485 A1 * | 5/2012 | Narasimha | ............ | H04W 68/02 455/437 |
| 2012/0213173 A1 * | 8/2012 | Malladi | .............. | H04B 7/15521 370/329 |
| 2013/0083709 A1 * | 4/2013 | Ahn | ...................... | H04L 1/1607 370/280 |
| 2013/0100918 A1 * | 4/2013 | Hong | ..................... | H04L 5/001 370/329 |
| 2013/0195063 A1 * | 8/2013 | Ahn | ..................... | H04L 5/0007 370/329 |
| 2013/0322350 A1 * | 12/2013 | Gaur | .................... | H04L 1/0013 370/329 |
| 2014/0146689 A1 * | 5/2014 | Gaur | ................... | H04J 11/0053 370/252 |
| 2014/0219196 A1 * | 8/2014 | Patel | ..................... | H04L 5/0091 370/329 |

(Continued)

*Primary Examiner* — Robert Wilson
(74) *Attorney, Agent, or Firm* — Lerner, David, Littenberg, Krumholz & Mentlik, LLP

(57) ABSTRACT

The power consumption in a client terminal is one of the important aspects of wireless communication systems. The power consumed when a client terminal is in standby mode when it is periodically monitoring the paging messages has a significant impact of the battery life. A method and apparatus are disclosed that enable reduction of the power consumption in standby mode and extend battery life of a client terminal.

30 Claims, 14 Drawing Sheets

(56) References Cited

U.S. PATENT DOCUMENTS

| | | | |
|---|---|---|---|
| 2014/0241269 A1* | 8/2014 | Smee | H04W 72/042 370/329 |
| 2014/0301296 A1* | 10/2014 | Vos | H04L 1/00 370/329 |
| 2015/0009952 A1* | 1/2015 | Berggren | H04W 72/042 370/330 |
| 2016/0062822 A1* | 3/2016 | Miyazaki | G06F 11/1004 714/807 |

\* cited by examiner

METHOD AND APPARATUS TO REDUCE POWER CONSUMPTION IN STANDBY MODE FOR WIRELESS COMMUNICATION SYSTEMS

BACKGROUND

As shown in FIG. 1, a wireless communication system comprises elements such as client terminal or mobile station 12 and base stations 14. Other network devices that may be employed, such as a mobile switching center, are not shown. In some wireless communication systems, there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems, the client terminal or mobile station (MS) communicates with the BS in both DL and UL directions. For instance, this is the case in cellular telephone systems. In other wireless communication systems, the client terminal communicates with the base stations in only one direction, usually the DL. This may occur in applications such as paging.

The base station to which the client terminal is communicating with is referred as the serving base station. In some wireless communication systems, the serving base station is normally referred as the serving cell. The terms base station and a cell may be used interchangeably herein. In general, the cells that are near the serving cell are called neighbor cells. Similarly, in some wireless communication systems a neighbor base station is normally referred as a neighbor cell.

The $3^{rd}$ Generation Partnership Project (3GPP) Long Term Evolution (LTE) wireless communication system is one of the widely deployed wireless technologies. The power consumption in the client terminal is one of the important design considerations in 3GPP LTE wireless communication system. Generally, the power consumption may be divided into two categories. The power consumed by the client terminal when it is in active mode such as when in a voice call, a video call, messaging, or internet browsing. The power consumed when the client terminal is in standby mode when it may be only monitoring the paging messages periodically.

When in standby mode, the client terminal is required to receive and decode paging messages in order to be able to respond to any possible incoming calls or data transfers. To reduce the power consumption during standby mode, the client terminal may be configured to receive and decode the paging messages at regular intervals. This is referred to as Discontinuous Reception (DRX) cycle. An example scenario may be that one paging message may need to be decoded by the client terminal once every second. The reception of a single paging message may be performed over a duration of one millisecond. The power consumption in standby mode of the client terminal may be determined by two factors: the power consumed by the client terminal when it is receiving and decoding a paging message and the power consumed due to leakage when the client terminal is in sleep mode when it may turn off most of its components. The sleep mode is a sub-mode within the standby mode of a client terminal. This scenario is illustrated in FIG. 2. The average power consumed by the client terminal is the weighted average of the power consumed during the sleep mode and the power consumed during paging message(s) reception. In the present disclosure, the term standby mode is used to refer to the lower power mode of the modem and RF subsystems. A client terminal may have other subsystems which may have their own power management procedures.

The power consumption during standby mode may be reduced by one of three main factors. One factor is the periodicity of the paging message(s) reception, i.e., DRX cycle duration. However, this periodicity is partly controlled by the network configuration and the need for a reduced latency operation. If a long DRX cycle is used, it may take longer to receive a call or setup a data connection. The second factor is the amount of the leakage power, which may be reduced through advanced integrated circuit design and control techniques. The third factor is the amount of power consumed during the reception of the paging messages.

BRIEF SUMMARY

In accordance with aspect of the present invention, a method and apparatus are disclosed that, on average, reduce the power consumption during the reception of paging messages.

In accordance with an aspect of the invention, a method may decode payload data of a Physical Downlink Shared Channel (PDSCH) in a subframe of a signal of a wireless communication system. The method may include: controlling, by a processing device, receiving a transport block of the PDSCH, in which the payload data is encoded as a first set of K encoded bits included in the transport block and the transport block includes the payload data encoded as at least one second set of K encoded bits; and starting decoding the first set of K encoded bits, after the first set of K encoded bits is received and before all bits of the second set of encoded bits are received.

In one alternative, the method may include controlling, by the processing device, determining an Orthogonal Frequency Division Multiplexing (OFDM) symbol number of the subframe to which the first set of K encoded bits is allocated.

In one alternative, the method may include controlling, controlling, by the processing device, after the first set of K encoded bits is received using the OFDM symbol number, the starting decoding the first set of K encoded bits by a turbo decoder.

In one alternative, the method may include controlling, by the processing device, when the first set of K encoded bits is decoded successfully after the first set of K encoded bits is received, turning off receiver processing in a modem subsystem and radio frequency (RF) subsystem of a wireless communication device at which the signal is received.

In one alternative, the method may include controlling, by the processing device, when the first set of K encoded bits is determined to be decoded successfully, turning off radio frequency (RF) and physical layer circuitry of a wireless communication device when a Cyclic Redundancy Check (CRC) of the first set of K encoded bits is determined to be successful.

In one alternative, the method may include controlling, by the processing device, when the first set of K encoded bits is determined to be not decoded successfully, receiving other encoded bits of the transport block until the second set of K encoded bits is received.

In one alternative, the method may include controlling, by the processing device, when the second set of K encoded bits is determined to be decoded successfully, turning off receiver processing in at least one of a modem or radio frequency (RF) subsystem of a wireless communication device at which the signal is received.

In one alternative, the method may include controlling, by the processing device, turning off receiver processing in a radio frequency (RF) subsystem of a wireless communication device at which the signal is received, when at least a predetermined number of Orthogonal Frequency Division Multiplexing (OFDM) symbols of the subframe to which the first set of K encoded bits is allocated is determined to be received, in which the number of OFDM symbols is according to a value of K and a value of G, in which G is a total number of bits available for transmission of a given transport block per subframe in the wireless communication system, and in which K and G are determined from a Physical Downlink Control Channel (PDCCH) in the subframe.

In one alternative, the turning off may be before the subframe is completely received.

In one alternative, the method may include controlling, by the processing device, turning off receiver processing in a modem subsystem of a wireless communication device at which the signal is received, when decoding of a given set of K encoded bits of a given transport block of the PDSCH into which the payload data is encoded is determined to be successful.

In one alternative, the method may include controlling, by the processing device, turning off a Central Processing Unit (CPU) subsystem of a wireless communication device at which the signal is received after processing in a modem subsystem and the processing in a RF subsystem processing of the wireless communication device are turned off, based on a determination whether any Information Element (IE) in content data obtained from decoding of a given set of K encoded bits of a given transport block of the PDSCH into which the payload data is encoded matches a subscriber identity of the wireless communication device.

In one alternative, the method may include controlling, by the processing device, turning off receiver processing in a modem subsystem and a radio frequency (RF) subsystem of a wireless communication device at which the signal is received, based on a confirmation from a Central Processing Unit (CPU) subsystem of the wireless communication device.

In one alternative, the confirmation may be based on checking of content data obtained from successful decoding of a given set of K encoded bits of a given transport block of he PDSCH into which the payload data is encoded.

In one alternative, the confirmation may be provided after the subframe is completely received.

In one alternative, the method may include controlling, by the processing device, switching a process of decoding the payload data encoded in the signal between a first decoding process and a second decoding process, in which, in the first decoding process, receiver processing in a modem subsystem and a radio frequency (RF) subsystem of a wireless communication device at which the signal is received are turned off according to a value of K and a value of G, in which G is a total number of bits available for transmission of a given transport block per subframe in the wireless communication system, and in which, in the second decoding process, the receiver processing in the modem subsystem and the radio frequency (RF) subsystem are turned off, based on a confirmation from a Central Processing Unit (CPU) subsystem of the wireless communication device.

In one alternative, the decoding of the signal may be started using the second decoding process.

In one alternative, the decoding of the signal may be switched from the second decoding process to the first decoding process, when a determination based on the decoding of the signal using the second decoding process indicates successful decoding of the payload data based on decoding of less than a predetermined number of given sets of K encoded bits in the signal into which the payload data is encoded.

In one alternative, the decoding of the signal may be switched from the second decoding process to the first decoding process, based on a determination of successful decoding of a predetermined number of given sets of K encoded bits in the signal into which respective given payload data is encoded.

In one alternative, the decoding of the signal may be switched from the first decoding processing to the second decoding process, when a determination is decoding of a given payload data encoded in the signal as a given set of K encoded bits is not successful.

In one alternative, the decoding of the signal may be switched from the first decoding processing to the second decoding process, when a determination is a predetermined number of consecutive decodings of given sets of K encoded bits in the signal into which respective given payload data is encoded are not successful.

In one alternative, when the wireless communication device enters a standby mode in which the wireless communication device periodically receives and decodes the signal, the processing device may determine whether to use the first decoding processing or the second decoding process based on estimated channel conditions.

In one alternative, the estimated channel conditions may include at least one of Signal-to-Interference and Noise Ratio (SINR), Delay Spread and Doppler Spread.

In one alternative, when the wireless communication device enters the standby mode, the processing device may determine whether to use the first decoding process or the second decoding process based on the estimated channel conditions and a first set of thresholds for the SINR, the Delay Spread and the Doppler Spread stored in a memory of the wireless communication device.

In one alternative, the processing device may determine whether to switch from the first decoding process to the second decoding processing based on the estimated channel conditions and a second set of thresholds for the SINR, the Delay Spread and the Doppler Spread stored in the memory of the wireless communication device.

In one alternative, the processing device may determine whether to switch from the second decoding process to the first decoding process based on the estimated channel conditions and a third set of thresholds for the SINR, the Delay Spread and the Doppler Spread stored in the memory of the wireless communication device.

In one alternative, the second and third sets of thresholds may be selected to maintain hysteresis when switching between the first and second decoding processes.

In one alternative, the processing device may determine whether to switch between the first decoding process and the second decoding process based on estimated channel conditions.

In one alternative, when the decoding of the signal is one of the first and second decoding processes which is switched to based on the estimated conditions, the decoding of the signal may be switched to the other of the first and second decoding processes when a determination is a predetermined number of consecutive decodings of given sets of K encoded bits in the signal into which respective given payload data is encoded are not successful.

In one alternative, the payload data of the PDSCH may be one of a paging message, system information or a user payload of the PDSCH.

In accordance with an aspect of the invention, an apparatus may be configured for decoding payload data of a Physical Downlink Shared Channel (PDSCH) in a subframe of a signal of a wireless communication system. The apparatus may include circuitry configured to control: receiving a transport block of the PDSCH, in which the payload data is encoded as a first set of K encoded bits included in the transport block and the transport block includes the payload data encoded as at least one second set of K encoded bits; and starting decoding the first set of K encoded bits, after the first set of K encoded bits is received and before all bits of the second set of K encoded bits are received.

In accordance with an aspect of the invention, a wireless communication device may include a receiver to receive a signal of a wireless communication system; and a processing device configured to control decoding payload data of a Physical Downlink Shared Channel (PDSCH) in a subframe of the signal. The processing device may be configured to control: receiving a transport block of the PDSCH, in which the payload data is encoded as a first set of K encoded bits included in the transport block and the transport block includes the payload data encoded as at least one second set of K encoded bits; and starting decoding the first set of K encoded bits, after the first set of K encoded bits is received and before all bits of the second set of K encoded bits are received.

DETAILED DESCRIPTION

Figure 3:
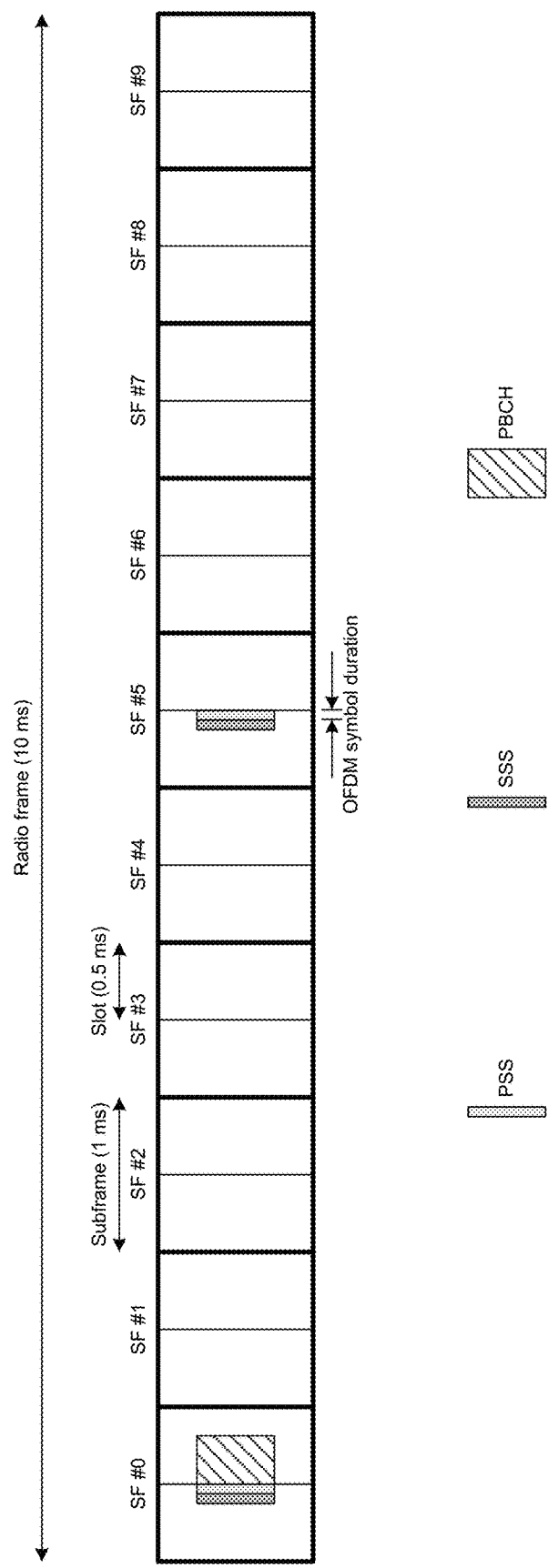
FIG. 3 illustrates a radio frame and its subframes in a 3GPP LTE wireless communication system air interface.

The 3GPP LTE wireless communication system air interface is organized into radio frames, subframes, and Orthogonal Frequency Division Multiplexing (OFDM) symbols as shown in FIG. 3. Each radio frame comprises ten subframes numbered from subframe 0 to subframe 9. The radio frame duration is 10 ms and the subframe duration is 1 ms. Each subframe comprises two slots with each slot of duration 0.5 ms. FIG. 3 also illustrates some of the control signals in the 3GPP LTE wireless communication system air-interface such as Primary Synchronization Sequence (PSS), Secondary Synchronization Sequence (SSS), and the Physical Broadcast Channel (PBCH).

Figure 4:
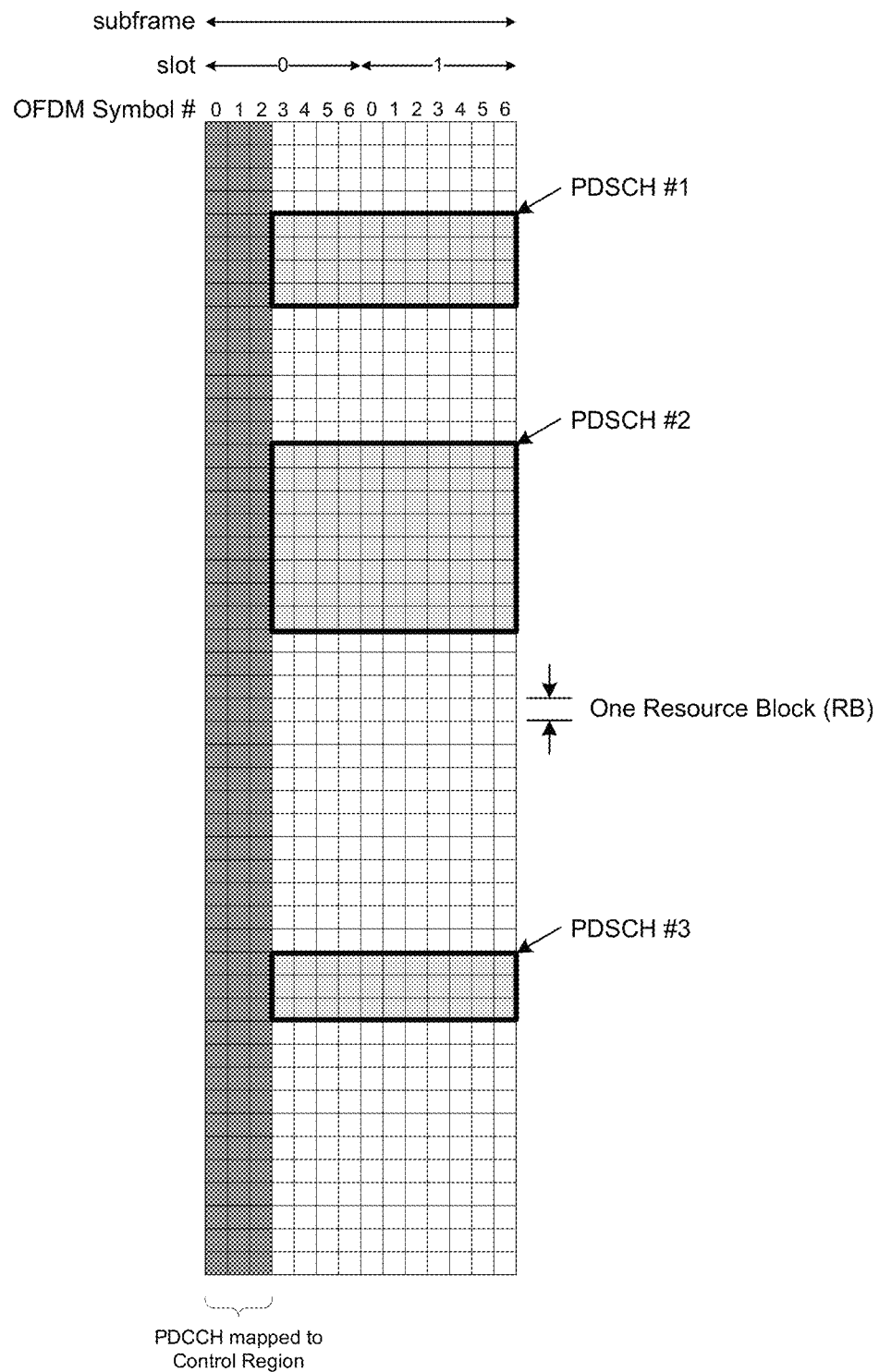
FIG. 4 illustrates a detailed structure of an example subframe in a 3GPP LTE wireless communication system air interface.

In a 3GPP LTE wireless communication system, the resource allocation may change once every millisecond in both DL and UL. The 3GPP LTE wireless communication system uses a control channel, called Physical Downlink Control Channel (PDCCH), for the purpose of dynamic resource allocation. The PDCCH describes which resources in the current subframe are allocated to which client terminals and for what purpose. FIG. 4 illustrates further details of a single subframe. Each subframe is organized into 14 or 12 OFDM symbols depending on whether Normal or Extended Cyclic Prefix (CP) is used. FIG. 4 shows a subframe structure with 14 OFDM symbols with Normal CP. The first few OFDM symbols of a subframe are used for control signaling. The PDCCH is mapped to the control region of a subframe. The physical channel on which the payload messages for client terminals are transmitted is called Physical Downlink Shared Channel (PDSCH). The PDSCH may be mapped to all the OFDM symbols in a subframe that are not used for the control region. FIG. 4 illustrates multiple PDSCHs in a single subframe. Different PDSCHs may be allocated to different client terminals. One of the PDSCHs may be used for transmitting a paging message. A client terminal may first decode the PDCCH and from that it may determine the specific PDSCH allocated to it. The minimum allocation granularity is one Resource Block (RB) as shown in FIG. 4. The PDCCH describes the exact RBs allocated and the Modulation and Coding Scheme (MCS) used for the transmission of a PDSCH.

The basic resource allocation granularity in 3GPP LTE wireless communication system is one subframe, i.e., resource allocation for receiving or transmitting payload information is performed at every subframe and the validity of the allocated resources is, typically, only for one subframe. The paging message for a particular client terminal may be transmitted in one particular subframe for every DRX cycle. The particular frame and subframe number on which the paging message is to be received by a given client terminal is known as Paging Occasion (PO) and it may be determined by the client terminal according to the criteria specified in the 3GPP LTE wireless communication system standards. The client terminal may determine the PO in advance of the actual subframe where it must perform paging message reception.

Different client terminals are identified in the 3GPP LTE wireless communication system using a type of identifier known as Radio Network Temporary Identifier (RNTI). Some RNTIs are of broadcast type, which address more than one client terminal in a cell, whereas other RNTIs address a particular client terminal. The paging messages for more than one client terminal may be sent using a broadcast identifier known as Paging-RNTI (P-RNTI).

The PDCCH carries the Downlink Control Information (DCI) as payload. The DCI provides the actual PDSCH allocation information. If the DCI indicates that the PDSCH resources are allocated for a particular client terminal then it may receive the rest of the OFDM symbols in the subframe to decode the PDSCH. If the PDCCH decoding is successful when using P-RNTI as the identity, then the client terminal knows that a paging message is broadcast in the current subframe. Note that the P-RNTI is a broadcast identifier and therefore the network may use that identifier to address one or more client terminals. Therefore, to know which specific client terminal is being paged, the client terminal must first decode the PDSCH and only then, it knows whether it is being specifically paged by the network.

After decoding the PDCCH with P-RNTI that describes the PDSCH, the client terminal starts the PDSCH decoding procedure. Since the paging message is a broadcast message, the network must ensure that the PDCCH with P-RNTI and the corresponding PDSCH carrying paging message are transmitted with sufficient quality. This is required to ensure that all the client terminals in the coverage area of the cell, including the ones at cell edge, can receive and decode the PDCCH with P-RNTI and the corresponding PDSCH with paging message.

Sufficient quality may mean transmit at higher power and/or use of robust MCS. In cellular systems that employ frequency reuse, increasing transmit power can lead to interference in neighboring cells. Therefore, often the more practical option to ensure sufficient quality for the paging message related PDCCH and PDSCH may be to use robust MCS.

For the UEs that are located closer to the center of the cell, the received signal quality may be better than the received signal quality for the client terminals that are at the cell edge. Therefore, the UEs at the center of the cell may be able to decode the paging message with relative ease.

Figure 5:
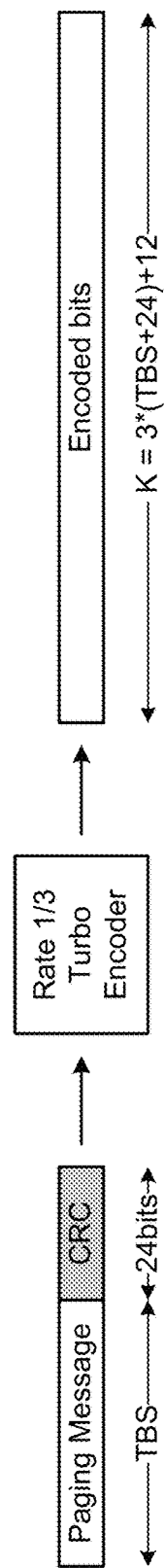
FIG. 5 illustrates the encoding process for a paging message Physical Downlink Shared Channel (PDSCH) in a 3GPP LTE wireless communication system air interface.

FIG. 5 shows the encoding procedure used for the transmission of the paging message in a 3GPP LTE wireless communication system. Any payload, such as paging message, from higher layers is referred to as transport block by the physical layer in the 3GPP LTE wireless communication system. The size of the transport block is referred to as Transport Block Size (TBS). A 24-bit Cyclic Redundancy Check (CRC) is attached to the transport block corresponding to the paging message. Normally, there are additional steps, such as code block segmentation, that are required before encoding, such as by the rate 1/3 Turbo encoding procedure. However, the maximum paging message length is small enough that code block segmentation is not required. The paging message is encoded using Turbo encoder as shown in FIG. 5. The total number of encoded output bits is given by $K=3*(TBS+24)+12$ where the 12 additional bits are used for trellis termination by the Turbo encoder.

Figure 6A:
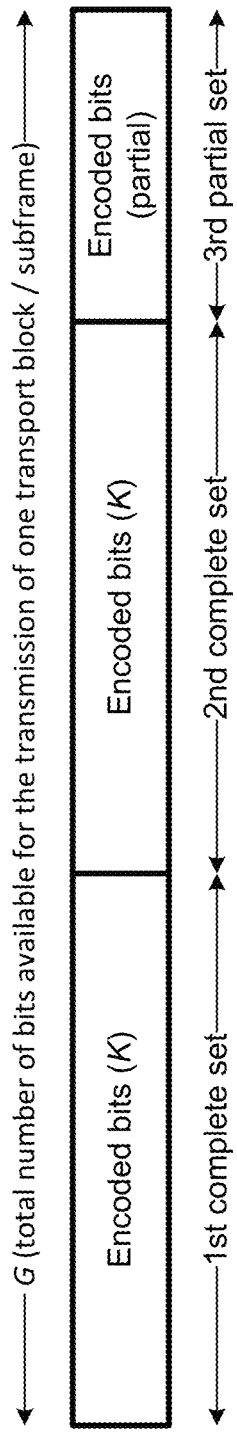
FIGS. 6A and 6B illustrate the rate matching scenarios when mapping of encoded bits to available channel bits in a 3GPP LTE wireless communication system air interface.
Figure 6B:
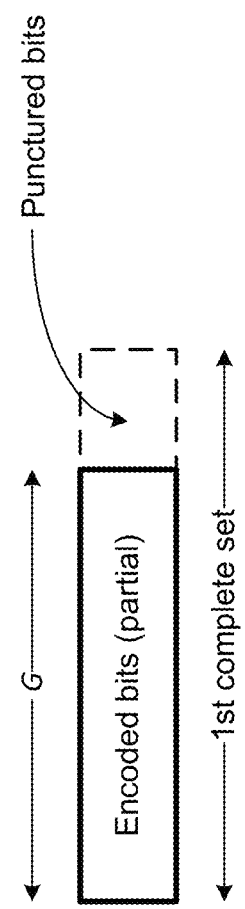

The encoded bits are eventually mapped to the allocated RBs for the paging message PDSCH. Let G denote the total number of bits available for the transmission of one transport block per subframe. The value of G depends on the number of RBs and the MCS used for the transmission of the PDSCH. After decoding the PDCCH, the client terminal knows the number of RBs and MCS used for the PDSCH that carries the paging message. Based on this information the client terminal may compute the TBS, K and the G value for the paging PDSCH. The total number of bits available for the transmission of one transport block per subframe is referred to as channel bits. The procedure to map the encoded bits to the channel bits is referred to as rate matching. Rate matching may lead to repetition of the encoded bits in some cases while in other cases it may puncture some encoded bits. Based on the value of TBS, K, and G, the client terminal can determine exactly how many repetitions of the encoded bits are transmitted in the current PDSCH as shown in FIG. 6($a$). Depending on the relative values of TBS, K, and G, it is possible that there is no repetition of any encoded bits and some bits may be punctured as shown in FIG. 6($b$). However, to ensure reliable reception of the paging message by the client terminals at the cell edge, the paging message may be transmitted with sufficient quality. Reliable reception may be ensured by the use of repetition of the encoded bits of a paging message which may lead to CRC pass and successful paging message PDSCH decoding at the receiver.

Figure 7:
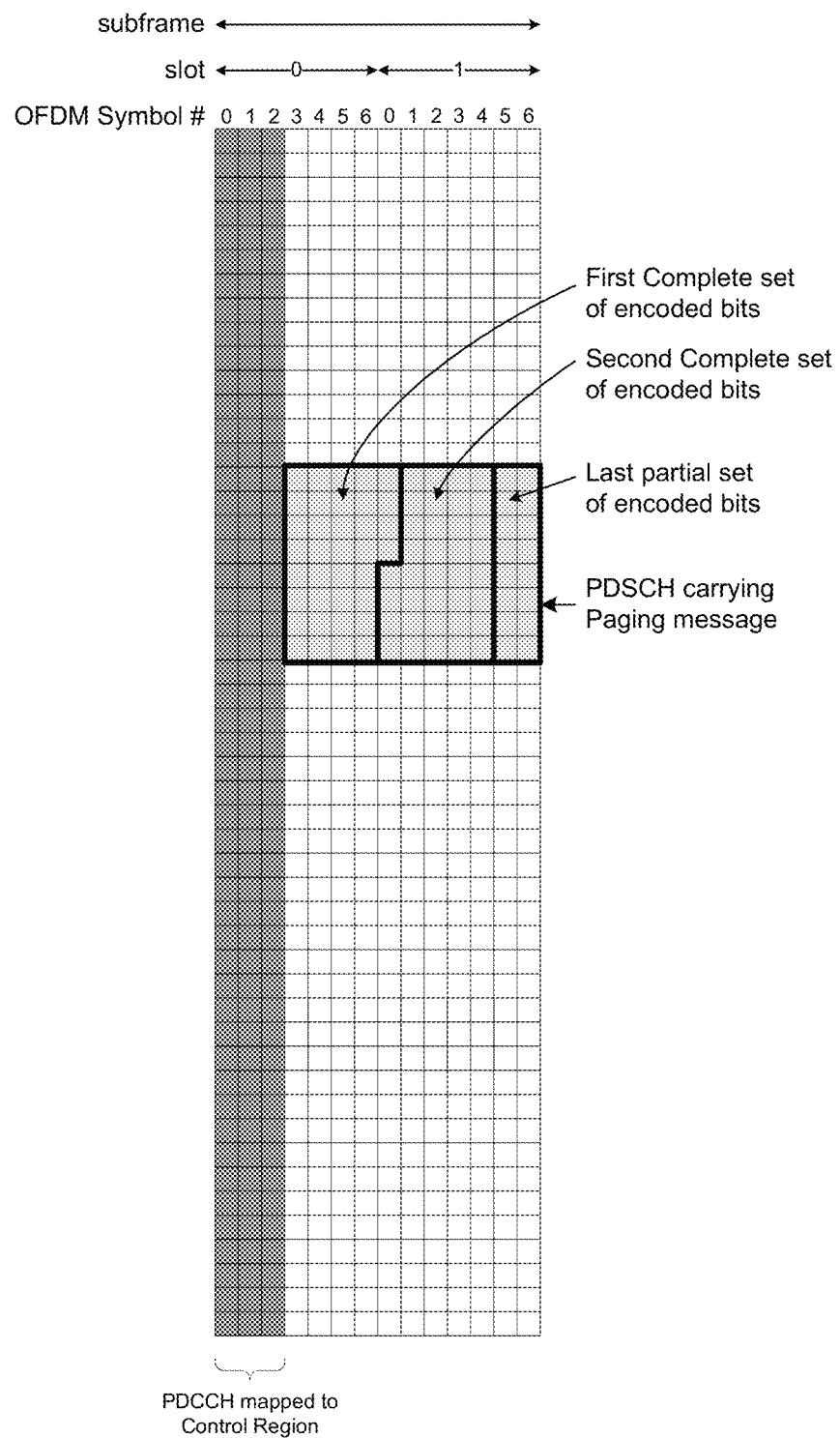
FIG. 7 illustrates the mapping of encoded bits to Orthogonal Frequency Division Multiplexing (OFDM) symbols in a 3GPP LTE wireless communication system air interface.

Based on the decoded PDCCH, the client terminal may determine the exact RBs used for the transmission of the PDSCH. FIG. 7 illustrates eight RBs allocated for transmission of the PDSCH. According to an aspect of the present invention, when repetition of the encoded bits is used, the client terminal may attempt to decode the PDSCH without waiting to receive all the repeated bits and start decoding the PDSCH after receiving the first set of encoded channel bits. According to another aspect of the invention, the client terminal may determine the OFDM symbol number at which the first complete set of K bits may be received. The client terminal may use this information to trigger the PDSCH turbo decoder after receiving first complete set of K bits. According to an aspect of the present invention, if the PDSCH decoding is successful after receiving one complete set of K encoded bits, the client terminal may turn off the receiver processing in both the modem and RF subsystems. According to an aspect of the present invention, the client terminal has to keep the various subsystems turned on for reduced amount of time for receiving the paging message. According to an aspect of the present invention, the client terminal may return to sleep mode earlier than in conventional methods.

Figure 8:
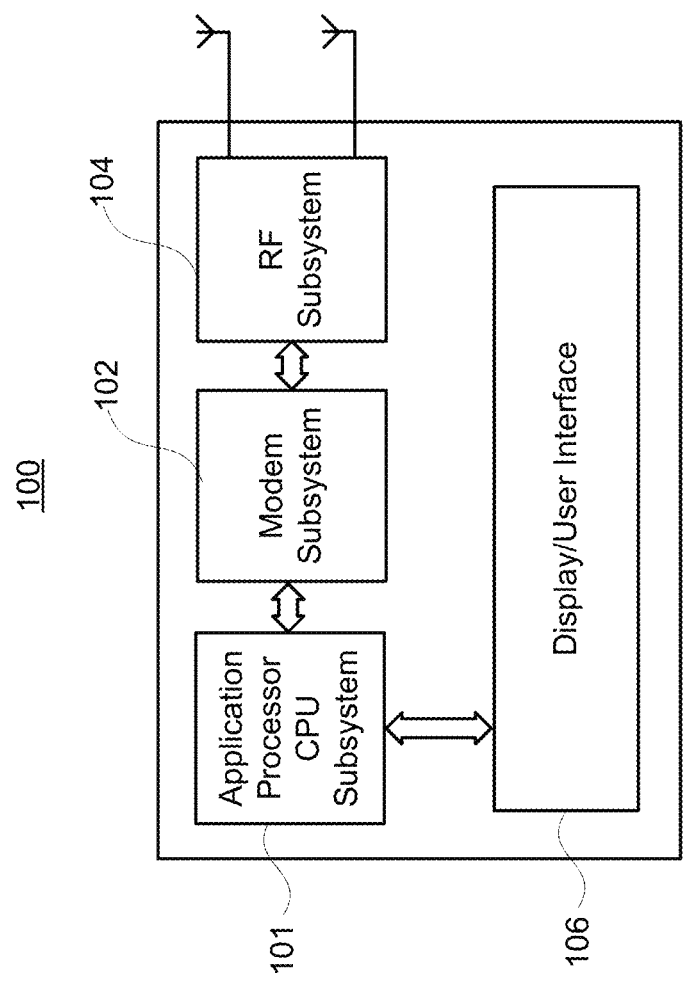
FIG. 8 illustrates a wireless mobile station diagram, which may be employed with aspects of the invention described herein.

As shown in FIG. 8, client terminal 100 may include an application processor containing Central Processing Unit (CPU) subsystem 101, modem subsystem 102 and an RF subsystem 104 for use with a wireless communication network. A display/user interface 106 provides information to and receives input from the user. By way of example, the user interface may include one or more actuators, a speaker and a microphone. In some mobile devices, certain combination of the application processor containing CPU subsystem 101, the modem subsystem 102 and the RF subsystem 104 are all integrated as one integrated chip. The higher layer protocol software or firmware for the 3GPP LTE specifications may be executed in the CPU subsystem 101.

According to an aspect of the present invention, if the PDSCH decoding is successful, the client terminal may turn off its RF and physical layer hardware circuitry as soon as the CRC for the PDSCH decoding is found to be successful. The protocol software may continue to run to check the content of the decoded paging message for any Information Element (IEs) that may include its identity such as International Mobile Subscriber Identity (IMSI). If the IEs in the paging message do not include its own identity (IMSI), then the client terminal may take the necessary steps to go back to sleep mode to reduce power consumption. This method allows the client terminal to re-enter sleep mode in shorter time after waking up to receive a paging message. This may increase the overall standby time of the client terminal.

According to an aspect of the present invention, if the decoding of the PDSCH based on only one complete set of K bits is not successful, the client terminal may continue to receive more bits in the PDSCH until second complete set of K encoded bits is received. When the second complete set of K encoded bits is received, the client terminal may combine the first complete set and second complete set of K encoded bits for improved performance and then may attempt to decode the paging message. According to an aspect of the present invention, if the decoding is successful after receiving the second set of K encoded bits, the client terminal may turn off the receiver processing in both the modem and RF subsystems. According to an aspect of the present invention, the client terminal has to keep the various subsystems turned on for reduced amount of time for receiving the paging message. According to an aspect of the present invention, the client terminal may return to sleep mode earlier than in conventional methods. The protocol software may continue to run to check the contents of the decoded paging message for any IEs that may include its identity such as IMSI. If the IEs do not include its own identity such as IMSI, then the client terminal may take the necessary steps to go back to sleep mode to reduce power consumption. This process continues until a PDSCH is decoded successfully or until the turbo decoder processes all the received bits in the subframe for the paging PDSCH.

Figure 9:
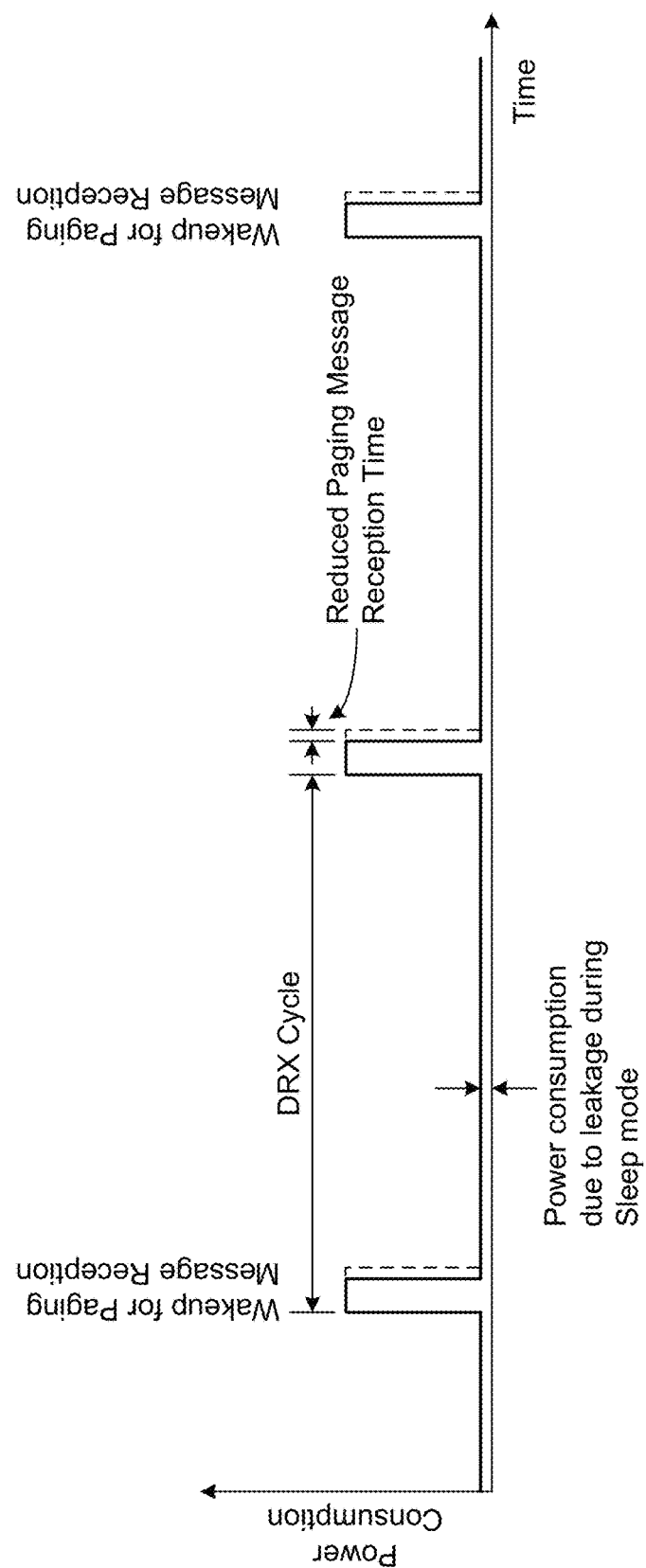
FIG. 9 illustrates the reduced paging reception time according to an aspect of the present invention.

The above method may enable the client terminal to reduce the amount of time it may have to be awake for paging message reception and remain in sleep mode for a longer duration of time as shown in FIG. 9. This may increase the standby time of the client terminal.

Figure 10:
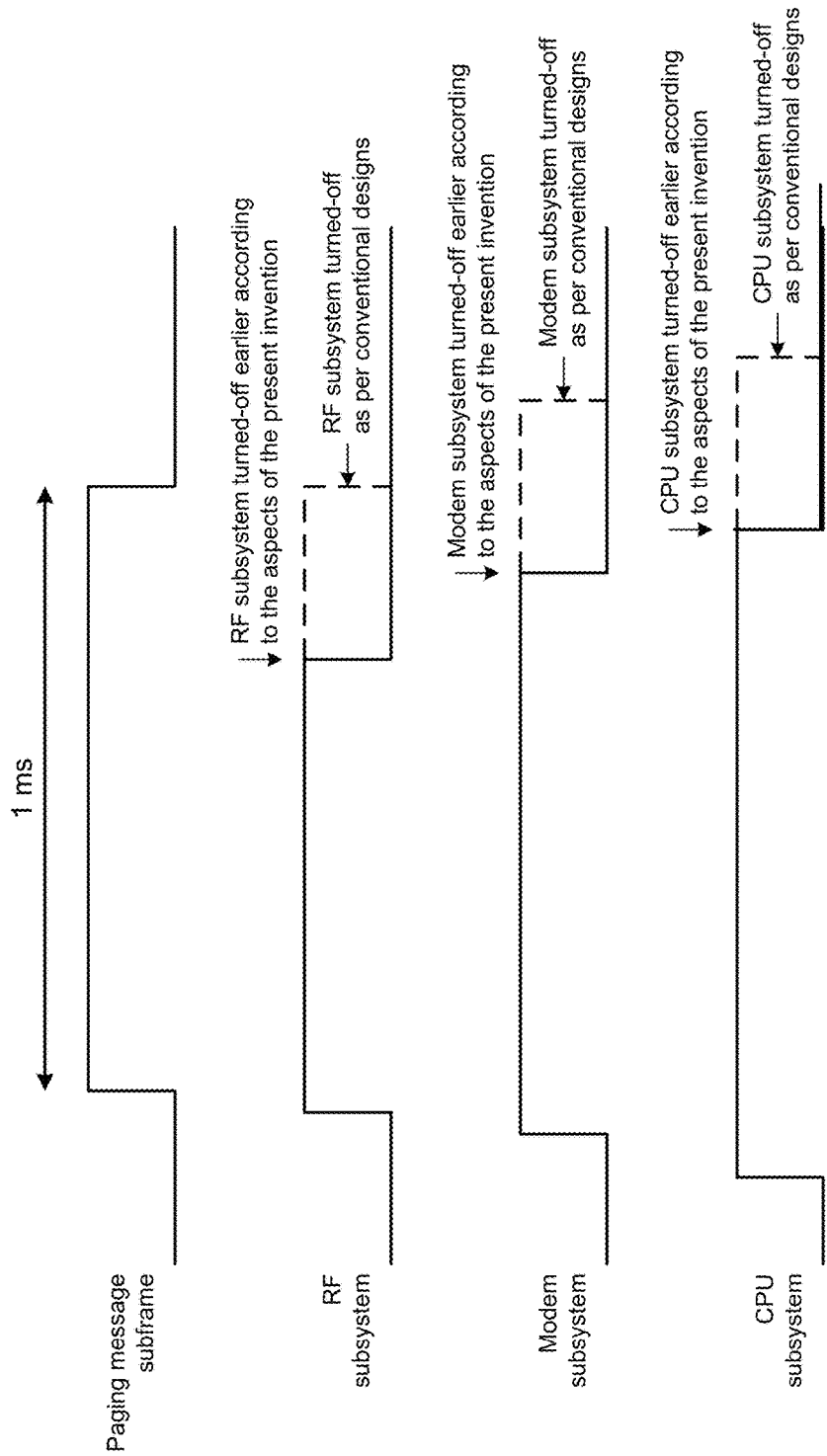
FIG. 10 illustrates further details the reduced paging reception time using a Method-1 according to an aspect of the present invention.

FIG. 10 shows further details of how internal modules of a client terminal may be turned on and turned off at different time instances depending on the paging message PDSCH decoding status according to the aspects of the present invention. Typically, prior to the occurrence of a paging message subframe, the CPU subsystem may wake up first and then turn on the modem subsystem followed by RF subsystem. In conventional methods of paging reception, the various subsystems may need to be kept turned on beyond the paging subframe duration as illustrated by dashed lines in FIG. 10. In a client terminal operating according to the aspects of the present invention, the RF subsystem may be turned off immediately after receiving the minimum required number of OFDM symbols according to the K and G values determined from the PDCCH. This may occur before the end of the paging subframe. Similarly, the modem subsystem may be turned off immediately after successfully decoding the PDSCH carrying the paging message. The CPU subsystem may be turned off the last after checking the contents of the decoded paging message and determining that none of the IEs match the IMSI of the client terminal. The method shown in FIG. 10 is referred herein as Method-1. According to the Method-1, the various subsystems of a client terminal are turned on for a shorter duration than in conventional methods. The dashed lines shown in FIG. 10 indicate the proportion of power savings achieved with the Method-1 according to the aspects of the present invention.

Figure 11:
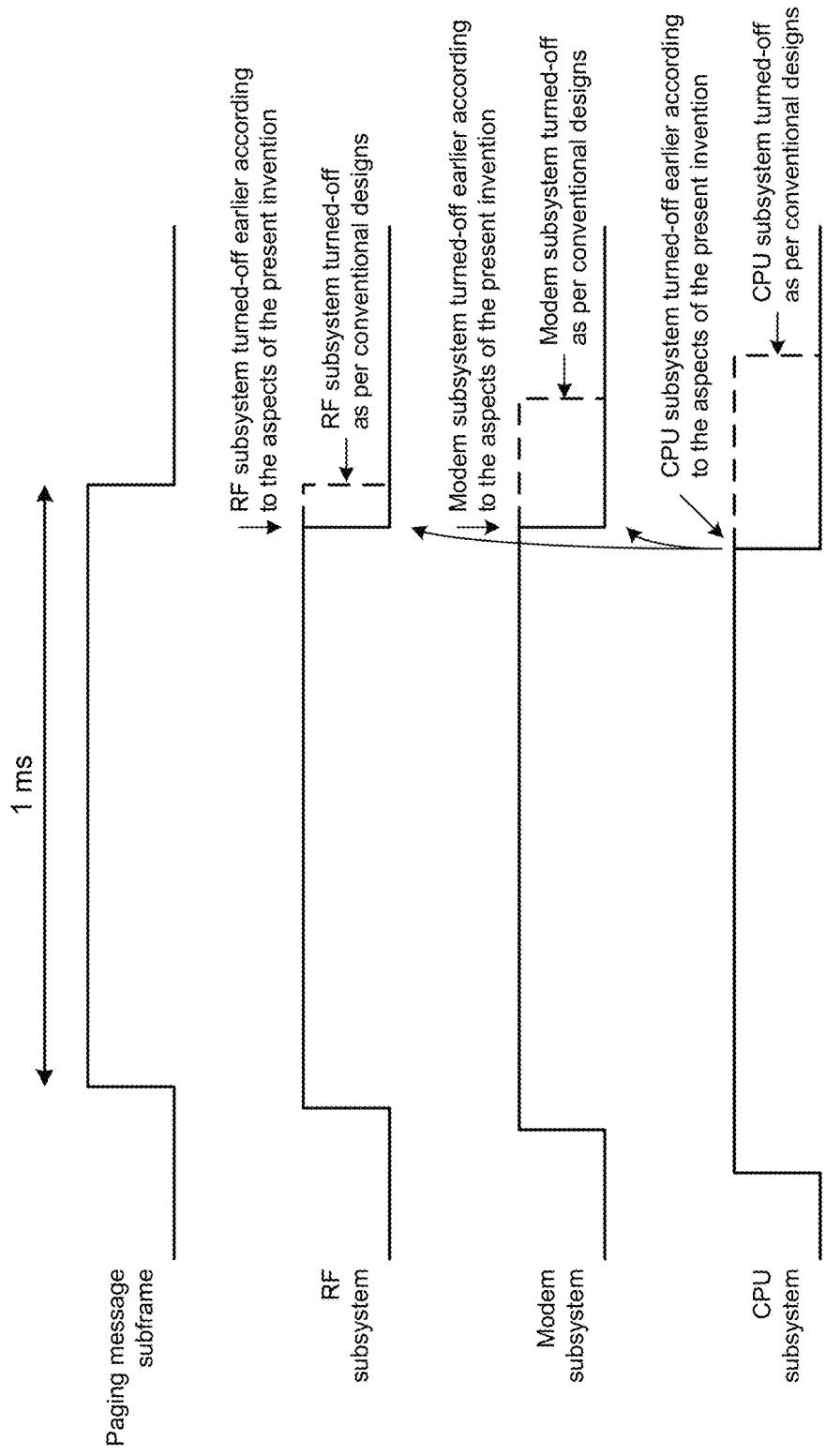
FIG. 11 illustrates further details the reduced paging reception time using a Method-2 according to an aspect of the present invention.

In the Method-1 of FIG. 10, the RF subsystem and modem subsystem may be turned off autonomously based on pre-computed values K and G without waiting for the CPU subsystem confirmation. FIG. 11 shows an alternate method, referred herein as Method-2, for disabling the various subsystems of a client terminal where the RF subsystem and the modem subsystem may be turned off after confirmation from the CPU subsystem according to the aspects of the present invention. The CPU subsystem may provide confirmation after checking the contents of the decoded paging message. The CPU subsystem may provide confirmation after reception of a complete subframe.

According to an aspect of the present invention, the client terminal may switch between the Method-1 and Method-2 for paging message decoding. The client terminal may begin with the Method-2. After the client terminal determines that it can reliably decode the paging message with fewer repetitions of the encoded channel bits, it may switch to Method-1 for further reduction in power consumption for receiving subsequent paging messages. The client terminal may make the determination to switch from Method-2 to Method-1 based on configurable number of successful paging message decoding. According to an aspect of the present invention, the client terminal may continue to use Method-1 until paging message decoding failure occurs. When a consecutive paging message decoding failure occurs for a configurable number of times, the client terminal may switch to Method-2.

According to an aspect of the present invention, a client terminal may use the estimated channel conditions such as the Signal-to-Interference and Noise Ratio (SINR), the Delay Spread, and the Doppler Spread to determine whether to use Method-1 or Method-2 for paging message reception when first entering the standby mode. According to an aspect of the present invention, a client terminal may use the estimated channel conditions such as the Signal-to-Interference and Noise (SINR), the Delay Spread, and the Doppler Spread to determine when to switch between the Method-1 and Method-2 for paging message reception. According to an aspect of the present invention, a client terminal may maintain a first set of thresholds for the SINR, Delay Spread, and Doppler Spread to determine whether to use Method-1 or Method-2 for paging message reception when first entering the standby mode. According to an aspect of the present invention, a client terminal may maintain a second set of thresholds for the SINR, Delay Spread, and Doppler Spread to determine when to switch from Method-1 to Method-2 for paging message reception. According to an aspect of the present invention, a client terminal may maintain a third set of thresholds for the SINR, Delay Spread, and Doppler Spread to determine when to switch from Method-2 to Method-1 for paging message reception. According to an aspect of the present invention, the second set of thresholds and the third set of thresholds may be selected such that hysteresis is maintained when switching between Method-1 and Method-2 to avoid frequent back and forth between the two methods.

The aspect of the present invention that switches the paging message reception from Method-1 to Method-2 based on a configurable number of consecutive paging reception failures may override the paging reception method selected based on the channel conditions.

The aspects of the present invention may be applied to PDSCHs other than the paging message PDSCH. For example, the aspects of the present invention may be used for System Information (SI) related PDSCHs, user payload PDSCHs, or PDSCHs carrying any other type of payload.

Figure 1:
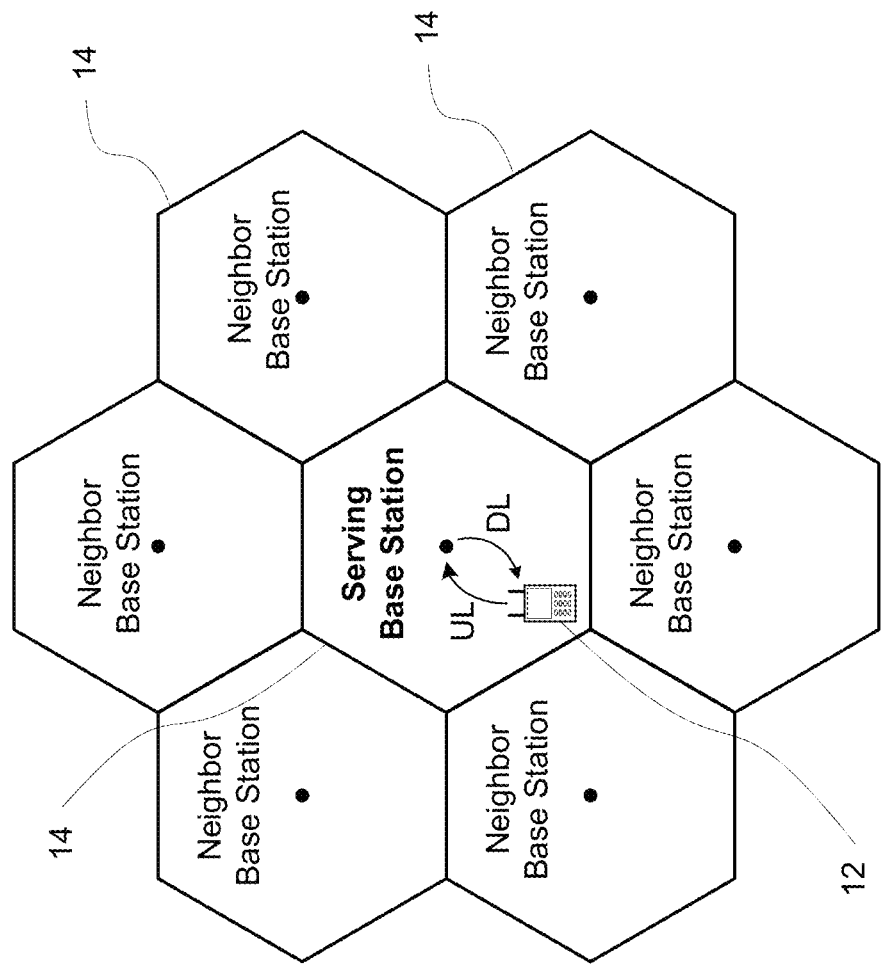
FIG. 1 illustrates a conventional mobile wireless communication system.
Figure 2:
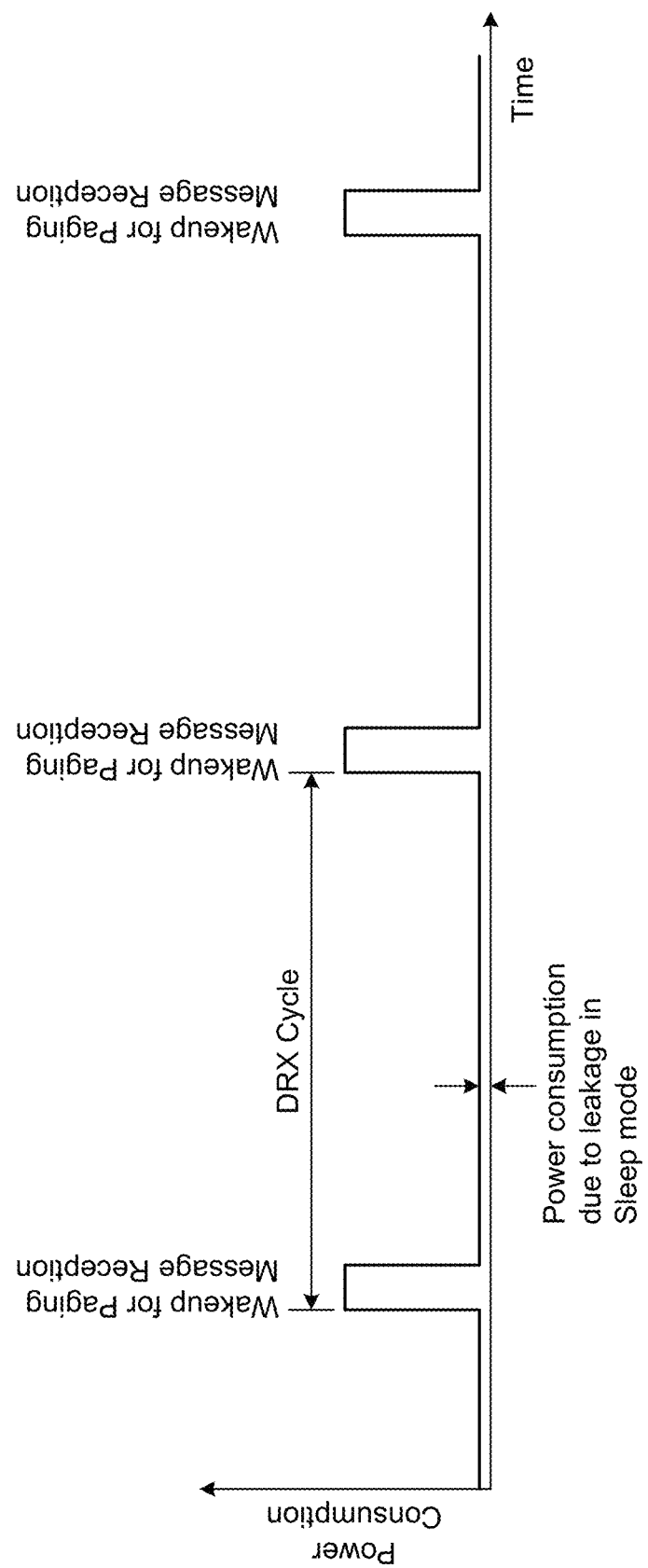
FIG. 2 illustrates an example paging message(s) reception cycle scenario when the client terminal is in standby mode.

By way of example only, the above-described method may be implemented in a receiver, e.g., a user device such as a wireless mobile station (MS) 12 as shown in FIG. 1.

Figure 12:
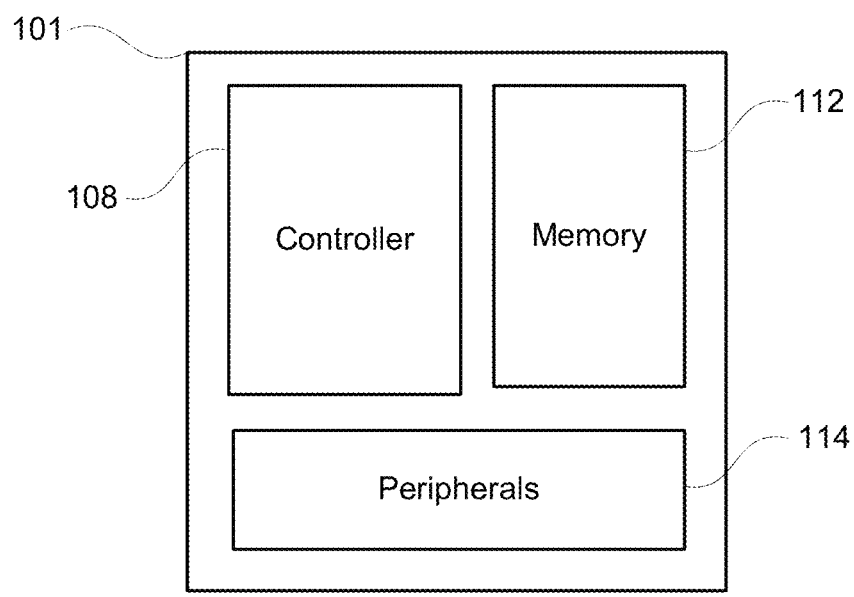
FIG. 12 illustrates an application processor containing a Central Processing Unit (CPU) subsystem for a wireless mobile station, which may be employed with aspects of the invention described herein.
Figure 13:
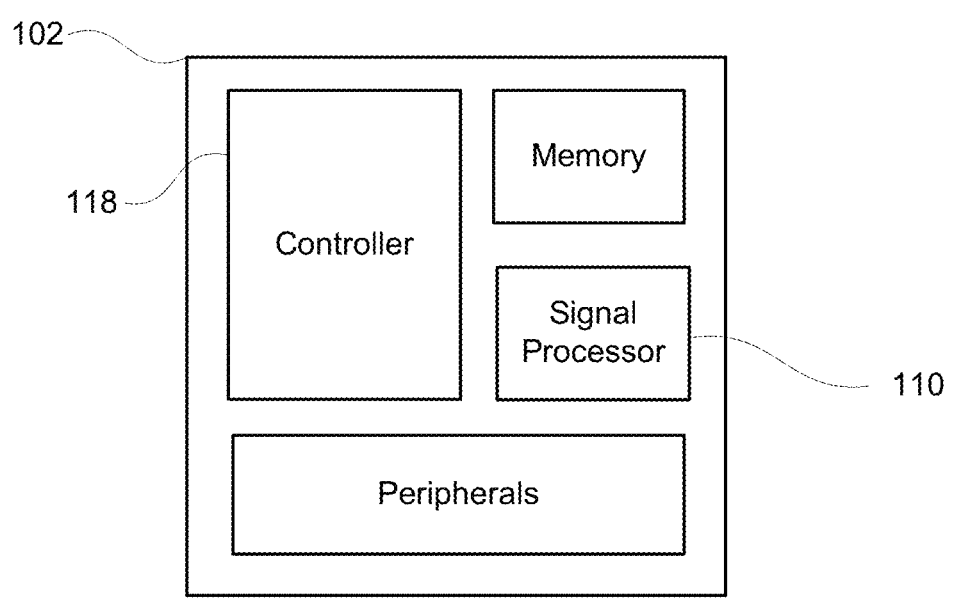
FIG. 13 illustrates a modem subsystem for a wireless mobile station, which may be employed with aspects of the invention described herein.
Figure 14:
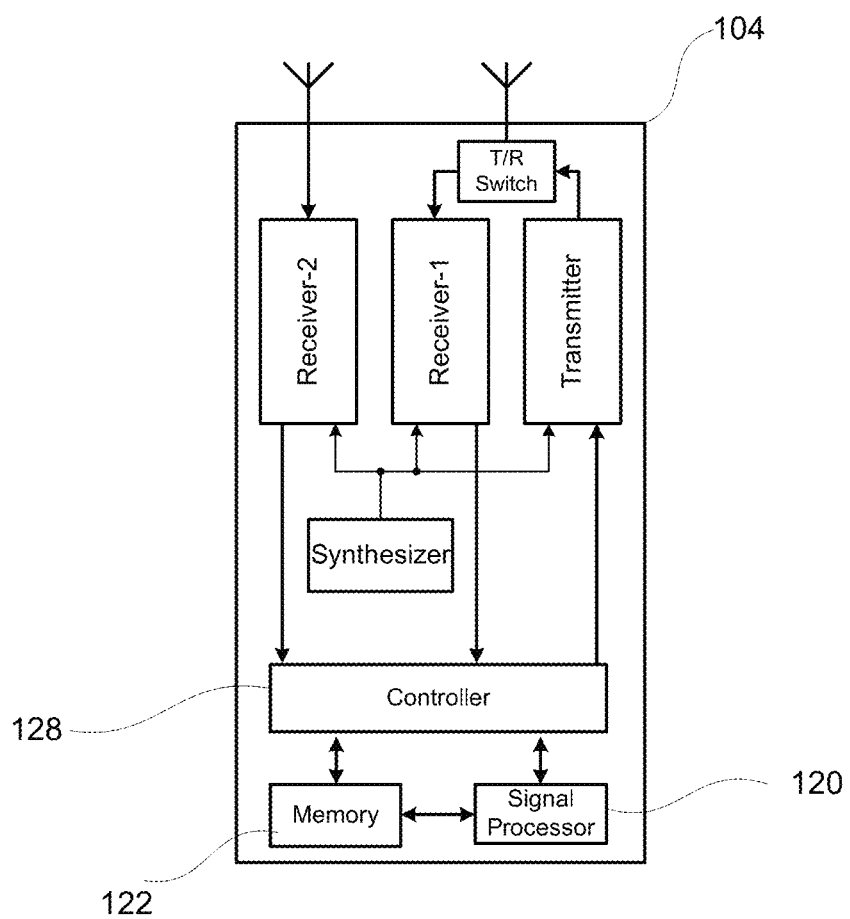
FIG. 14 illustrates an RF subsystem for a wireless mobile station, which may be employed with aspects of the invention described herein.

The application processor containing CPU subsystem 101 as shown in FIG. 12 may include a controller 108 such as a microcontroller or other processor. The modem subsystem 102 as shown in FIG. 13 may include a controller 118 such as a microcontroller or other processor. The RF subsystem 104 as shown in FIG. 14 may include a controller 128 such as a microcontroller or other processor. The controller 108 desirably handles overall operation of the MS 100. This may be done by software or firmware running on the controller 108. Such software/firmware may embody any methods in accordance with aspects of the present invention.

Peripherals 114 such as a full or partial keyboard, video or still image display, audio interface, etc may be employed and managed through the controller 108.

Aspects of the present invention may be implemented in firmware of the controller 108 of the application processor and/or the controller 118 of the modem subsystem. In another alternative, aspects of the present invention may also be implemented as a combination of firmware and hardware of the application processor containing CPU subsystem 101 and/or the modem subsystem 102. For instance, a signal processing entity of any or all of the FIG. 13 may be implemented in firmware, hardware and/or software. It may be part of the modem subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use aspects of this invention may include smartphones, tablets, laptops, gaming consoles, cameras, video camcorders, TV, car entertainment systems, etc.

Although the aspects of the invention herein have been described with reference to particular embodiments, it is to be understood that these embodiments are merely illustrative of the principles and applications of the aspects of the present invention. It is therefore to be understood that numerous modifications may be made to the illustrative embodiments and that other arrangements may be devised without departing from the spirit and scope of the aspects of the present invention as defined by the appended claims. Aspects of each embodiment may be employed in the other embodiments described herein.

The invention claimed is:

1. A method for decoding payload data of a Physical Downlink Shared Channel (PDSCH) in a subframe of a signal of a wireless communication system, the method comprising:
controlling, by a processing device,
receiving a transport block of the PDSCH, in which the payload data is encoded as a first set of K encoded bits included in the transport block and the transport block includes the payload data encoded as at least one second set of K encoded bits, in which K is a positive integer greater than one;
starting decoding the first set of K encoded bits, after the first set of K encoded bits is received and before all bits of the second set of K encoded bits are received; and
when the first set of K encoded bits is decoded successfully after the first set of K encoded bits is received, turning off receiver processing in a modem subsystem and radio frequency (RF) subsystem of a wireless communication device at which the signal is received.

2. The method of claim 1, further comprising:
controlling, by the processing device, determining an Orthogonal Frequency Division Multiplexing (OFDM) symbol number of the subframe to which the first set of K encoded bits is allocated.

3. The method of claim 2, further comprising:
controlling, by the processing device, after the first set of K encoded bits is received using the OFDM symbol number, the starting decoding the first set of K encoded bits by a turbo decoder.

4. The method of claim 1, further comprising:
controlling, by the processing device, when the first set of K encoded bits is determined to be decoded successfully, turning off RF and physical layer circuitry of the wireless communication device when a Cyclic Redundancy Check (CRC) of the first set of K encoded bits is determined to be successful.

5. The method of claim 1, further comprising:
controlling, by the processing device, when the first set of K encoded bits is determined to be not decoded successfully, receiving other encoded bits of the transport block until the second set of K encoded bits is received.

6. The method of claim 5, further comprising:
controlling, by the processing device, when the second set of K encoded bits is determined to be decoded successfully, turning off the receiver processing in at least one of the modem or RF subsystem of the wireless communication device.

7. The method of claim 1, further comprising:
controlling, by the processing device, turning off the receiver processing in the RF subsystem of the wireless communication device, when at least a predetermined number of Orthogonal Frequency Division Multiplexing (OFDM) symbols of the subframe to which the first set of K encoded bits is allocated is determined to be received,
in which the number of OFDM symbols is according to a value of K and a value of G, in which G is a total number of bits available for transmission of a given transport block per subframe in the wireless communication system, and in which K and G are determined from a Physical Downlink Control Channel (PDCCH) in the subframe, in which G is a positive integer greater than one.

8. The method of claim 7, wherein the turning off the receiver processing in the RF subsystem is before the subframe is completely received.

9. The method of claim 1, further comprising:
controlling, by the processing device, turning off the receiver processing in the modem subsystem, when decoding of a given set of K encoded bits of a given transport block of the PDSCH into which the payload data is encoded is determined to be successful.

10. The method of claim 1, further comprising:
controlling, by the processing device, turning off a Central Processing Unit (CPU) subsystem of the wireless communication device after the receiver processing in the modem subsystem and the RF subsystem are turned off, based on a determination whether any Information Element (IE) in content data obtained from decoding of a given set of K encoded bits of a given transport block of the PDSCH into which the payload data is encoded matches a subscriber identity of the wireless communication device.

11. The method of claim 1, further comprising:
controlling, by the processing device, turning off the receiver processing in the modem subsystem and the RF subsystem, based on a confirmation from a Central Processing Unit (CPU) subsystem of the wireless communication device.

12. The method of claim 11, wherein the confirmation is based on checking of content data obtained from successful decoding of a given set of K encoded bits of a given transport block of the PDSCH into which the payload data is encoded.

13. The method of claim 11, wherein the confirmation is provided after the subframe is completely received.

14. The method of claim 1, further comprising:
controlling, by the processing device, switching a process of decoding the payload data encoded in the signal between a first decoding process and a second decoding process,
in which, in the first decoding process, the receiver processing in the modem subsystem and the RF subsystem are turned off according to a value of K and a value of G, in which G is a total number of bits available for transmission of a given transport block per subframe in the wireless communication system, in which G is a positive integer greater than one, and
in which, in the second decoding process, the receiver processing in the modem subsystem and the RF subsystem are turned off, based on a confirmation from a Central Processing Unit (CPU) subsystem of the wireless communication device.

15. The method of claim 14, wherein the decoding of the signal is started using the second decoding process.

16. The method of claim 14, wherein the decoding of the signal is switched from the second decoding process to the first decoding process, when a determination based on the decoding of the signal using the second decoding process indicates successful decoding of the payload data based on decoding of less than a predetermined number of given sets of K encoded bits in the signal into which the payload data is encoded.

17. The method of claim 14, wherein the decoding of the signal is switched from the second decoding process to the first decoding process, based on a determination of successful decoding of a predetermined number of given sets of K encoded bits in the signal into which respective given payload data is encoded.

18. The method of claim 14, wherein the decoding of the signal is switched from the first decoding processing to the second decoding process, when a determination is decoding of a given payload data encoded in the signal as a given set of K encoded bits is not successful.

19. The method of claim 14, wherein the decoding of the signal is switched from the first decoding processing to the second decoding process, when a determination is a predetermined number of consecutive decodings of given sets of K encoded bits in the signal into which respective given payload data is encoded are not successful.

20. The method of claim 14, wherein, when the wireless communication device enters a standby mode in which the wireless communication device periodically receives and decodes the signal, the processing device determines whether to use the first decoding processing or the second decoding process based on estimated channel conditions.

21. The method of claim 20, wherein the estimated channel conditions include at least one of Signal-to-Interference and Noise Ratio (SINR), Delay Spread and Doppler Spread.

22. The method of claim 21, wherein, when the wireless communication device enters the standby mode, the processing device determines whether to use the first decoding process or the second decoding process based on the estimated channel conditions and a first set of thresholds for the SINR, the Delay Spread and the Doppler Spread stored in a memory of the wireless communication device.

23. The method of claim 22, wherein the processing device determines whether to switch from the first decoding process to the second decoding processing based on the estimated channel conditions and a second set of thresholds for the SINR, the Delay Spread and the Doppler Spread stored in the memory of the wireless communication device.

24. The method of claim 23, wherein the processing device determines whether to switch from the second decoding process to the first decoding process based on the estimated channel conditions and a third set of thresholds for the SINR, the Delay Spread and the Doppler Spread stored in the memory of the wireless communication device.

25. The method of claim 24, wherein the second and third sets of thresholds are selected to maintain hysteresis when switching between the first and second decoding processes.

26. The method of claim 14, wherein the processing device determines whether to switch between the first decoding process and the second decoding process based on estimated channel conditions.

27. The method of claim 26, wherein, when the decoding of the signal is one of the first and second decoding processes which is switched to based on the estimated conditions, the decoding of the signal is switched to the other of the first and second decoding processes when a determination is a predetermined number of consecutive decodings of given sets of K encoded bits in the signal into which respective given payload data is encoded are not successful.

28. The method of claim 1, wherein the payload data of the PDSCH is one of a paging message, system information or a user payload of the PDSCH.

29. An apparatus for decoding payload data of a Physical Downlink Shared Channel (PDSCH) in a subframe of a signal of a wireless communication system, the apparatus comprising:
a processor and a memory including instructions, which when executed by the processor, control:
receiving a transport block of the PDSCH, in which the payload data is encoded as a first set of K encoded bits included in the transport block and the transport block includes the payload data encoded as at least one second set of K encoded bits, in which K is a positive integer greater than one;
starting decoding the first set of K encoded bits, after the first set of K encoded bits is received and before all bits of the second set of K encoded bits are received; and
when the first set of K encoded bits is decoded successfully after the first set of K encoded bits is received, turning off receiver processing in a modem subsystem and radio frequency (RF) subsystem of a wireless communication device at which the signal is received.

30. A wireless communication device comprising:
a receiver to receive a signal of a wireless communication system; and a processor configured to control decoding payload data of a Physical Downlink Shared Channel (PDSCH) in a subframe of the signal, wherein the processor is configured to control:

receiving a transport block of the PDSCH, in which the payload data is encoded as a first set of K encoded bits included in the transport block and the transport block includes the payload data encoded as at least one second set of K encoded bits, in which K is a positive integer greater than one;

starting decoding the first set of K encoded bits, after the first set of K encoded bits is received and before all bits of the second set of K encoded bits are received; and when the first set of K encoded bits is decoded successfully after the first set of K encoded bits is received, turning off receiver processing in a modem subsystem and radio frequency (RF) subsystem of the wireless communication device.

* * * * *